US012748763B2

(12) United States Patent
Middendorf et al.

(10) Patent No.: US 12,748,763 B2
(45) Date of Patent: Sep. 29, 2026

(54) SYSTEMS AND METHODS FOR INTELLIGENT AUTOMATIC FILING OF DOCUMENTS IN A CONTENT MANAGEMENT SYSTEM

(71) Applicant: OPEN TEXT SA ULC, Halifax (CA)

(72) Inventors: Matthias Theodor Middendorf, Reichenau (DE); Jochen Matthias van den Bercken, Munich (DE)

(73) Assignee: Open Text SA ULC, Halifax (CA)

(*) Notice: Subject to any disclaimer, the term of this patent is extended or adjusted under 35 U.S.C. 154(b) by 0 days.

(21) Appl. No.: 18/537,429

(22) Filed: Dec. 12, 2023

(65) Prior Publication Data

US 2024/0126770 A1 Apr. 18, 2024

Related U.S. Application Data

(63) Continuation of application No. 17/377,250, filed on Jul. 15, 2021, now Pat. No. 11,893,031.

(51) Int. Cl.

*G06F 16/00* (2019.01)
*G06F 16/2457* (2019.01)
*G06N 20/00* (2019.01)

(52) U.S. Cl.

CPC ....... *G06F 16/24578* (2019.01); *G06N 20/00* (2019.01)

(58) Field of Classification Search

CPC .......................... G06F 16/24578; G06N 20/00
USPC .......................................................... 707/723
See application file for complete search history.

(56) References Cited

U.S. PATENT DOCUMENTS

| | | | | |
|---|---|---|---|---|
| 11,321,736 | B2 | 5/2022 | Lagi et al. | |
| 12,450,200 | B2 | 10/2025 | Middendorf et al. | |
| 2010/0070448 | A1* | 3/2010 | Omoigui | H01L 27/1463 706/55 |
| 2012/0158633 | A1* | 6/2012 | Eder | G16H 50/50 707/E17.014 |
| 2013/0219176 | A1 | 8/2013 | Akella et al. | |

(Continued)

OTHER PUBLICATIONS

Office Action issued for U.S. Appl. No. 17/377,253, mailed Jul. 18, 2024, 19 pages.

(Continued)

*Primary Examiner* — Tuankhanh D Phan
(74) *Attorney, Agent, or Firm* — Sprinkle IP Law Group

(57) ABSTRACT

Embodiments provide for intelligent auto filing of documents to enterprise content management workspaces. One embodiment of a method includes receiving a document to auto file to a workspace of a content management system; detecting an indicator of an entity from the text of a document, the indicator of the entity corresponding to a value of a workspace attribute; determining a result set of candidate records based on querying a set of workspace data for workspaces with the workspace attribute value corresponding to the indicator; detecting mentions in the document text that match attribute values from the candidate records; generating a score for each candidate record based on the mentions detected in the text that match the attribute values from the candidate record; linking the document to an entity based on the scores for the candidate record; and automatically storing the document to a workspace based on the linking.

18 Claims, 7 Drawing Sheets

(56) References Cited

U.S. PATENT DOCUMENTS

| | | | | |
|---|---|---|---|---|
| 2014/0344446 | A1* | 11/2014 | Rjeili | H04L 43/04 709/224 |
| 2016/0048936 | A1* | 2/2016 | Perkowski | G06Q 10/063 705/310 |
| 2018/0075138 | A1* | 3/2018 | Perram | G06F 16/93 |
| 2018/0082183 | A1* | 3/2018 | Hertz | G06Q 10/10 |
| 2022/0229863 | A1* | 7/2022 | Schwarz | G06F 40/30 |
| 2022/0318491 | A1* | 10/2022 | Keslin | G06F 16/34 |
| 2023/0020568 | A1* | 1/2023 | Middendorf | G06F 16/24578 |
| 2026/0010517 | A1 | 1/2026 | Middendorf et al. | |

OTHER PUBLICATIONS

Examination Report issued by the European Patent Office for European Patent Application No. 22185275.9, mailed Nov. 28, 2023, 6 pages.
Office Action issued for U.S. Appl. No. 17/377,253, mailed Feb. 1, 2024, 18 pages.
Office Action issued for U.S. Appl. No. 17/377,253, mailed Feb. 6, 2025, 6 pages.
Notice of Allowance issued for U.S. Appl. No. 17/377,253, mailed Jun. 12, 2025, 7 pages.
Office Action issued for U.S. Appl. No. 19/327,752, mailed on Jul. 1, 2026, 16 pages.

* cited by examiner

SYSTEMS AND METHODS FOR INTELLIGENT AUTOMATIC FILING OF DOCUMENTS IN A CONTENT MANAGEMENT SYSTEM

CROSS-REFERENCE TO RELATED APPLICATION(S)

This application is a continuation of, and claims a benefit of priority under 35 U.S.C. 120 from, U.S. patent application Ser. No. 17/377,250, filed Jul. 15, 2021, issued as U.S. Pat. No. 11,893,031, entitled "SYSTEMS AND METHODS FOR INTELLIGENT AUTOMATIC FILING OF DOCUMENTS IN A CONTENT MANAGEMENT SYSTEM," which is fully incorporated by reference herein for all purposes.

TECHNICAL FIELDS

Embodiments of the present disclosure relate to automated filing of content objects. More particularly, embodiments of the present disclosure relate to entity-based automated filing of content objects. Even more particularly, embodiments of the present disclosure relate to automated filing of content objects to workspaces using entity-linking.

BACKGROUND

Large organizations employ a variety of systems to manage content and processes. For example, an organization may use an enterprise content management (ECM) system to store and manage primarily unstructured content (e.g., documents) and an enterprise management system, such as an enterprise resource planning (ERP) system, a customer relationship management (CRM) system, a human capital management (HCM) system or a business process management (BPM) system, to manage structured data for day-to-day businesses processes. Unfortunately, these systems may have limited interoperability. The unstructured content managed by the ECM and the structured data used by enterprise management systems are often separate from each other and scattered across information silos. This can make it difficult for a user who manages processes through an enterprise management system to access various relevant data because the data may be contained in the ECM or other enterprise management systems or ECMs.

An extended ECM system may be used to integrate data from heterogeneous content management and process management systems. Integrations can include various enterprise management systems, such as CRM systems, HR or HCM systems, BPM systems. Integrations with other content management systems and productivity tools may also be supported. In some implementations, the extended ECM system provides two-way integration that can surface information from integrations through the extended ECM system and propagate data from the extended ECM system to the integrations.

Business users of an extended ECM system may utilize workspaces to view, modify, or otherwise manipulate data related business processes. A workspace in an extended ECM system may be tied to a particular business object (BO) in an external system but also integrate data from a number of systems to provide a more complete view of related information, in a unified user interface. The workspace may provide access to the BO to which it is connected, related BOs and transactions, up-to-date metadata collected from ERP, CRM, HCM or other enterprise management systems and content objects containing unstructured text stored in the workspace.

One important feature of extended ECM systems is the capability to integrate structured data used in resource and process management with unstructured data contained in documents and other content objects into a workspace which may be viewed and interacted with through one user-friendly interface. Extended ECM systems provide limited capabilities, however, to automatically file content objects to workspaces. Content objects generated internally by the extended ECM system or enterprise management system during a managed business process in awareness of the relation of the content object to a BO can be automatically filed to the workspace connected to that BO. Content objects with external origin via a channel that links the content object to the BO (e.g., based on sender) may be filed in the workspace connected to the linked BO. Extended ECM systems, however, provide little or no capability to automatically file content objects to a workspace when the content object has no a priori relation to a BO or connected workspace. The process of filing is thus often a highly manual process except in limited circumstances.

There is a need for improved mechanisms to automatically file content objects. More particularly, there is a need for improved mechanisms to automatically file content objects to the correct workspaces.

SUMMARY

Attention is thus directed to systems, methods, and computer program products for intelligent auto filing of content objects.

According to one aspect of the present disclosure, intelligent auto filing is performed based on entity linking. Intelligent auto filing includes detecting and extracting indicators of entities from documents, using the extracted indicators to identify candidate entities, and using the attribute values of the candidate entities to determine the relevance/correspondence of the document to the entities and to link the document to an entity. The link to an entity can be used to file the document in a location associated with the entity, such as in a workspace that represents the entity.

More particularly, one embodiment includes a computer-implemented method of auto filing documents to workspaces, such as workspaces in an extended enterprise content management environment that are linked to business objects in an enterprise management system. In accordance with one embodiment, a computer-implemented method can thus include providing a set of workspace data comprising attribute values and relationships for a plurality of workspaces in a content management system. The workspaces may correspond to business objects in an enterprise management system that represent entities. The attribute values of the workspaces may represent properties of the entities.

The method can further include receiving a document for filing and detecting strong indicators of entities from the text of the document. A strong indicator of an entity may correspond to a workspace attribute value.

The strong indicators can be used to query the set of workspace data for workspaces with the workspace attribute values corresponding to the strong indicators. Thus, a result set of candidate records can be determined based on the querying. Each candidate record in the result set of candidate records may correspond to a corresponding workspace from the plurality of workspaces and include a set of attribute values for a workspace attribute corresponding to a detected strong indicator.

The auto filing method can further include generating scores for the result set of candidate records. Generating the scores for the result set of candidate records can include detecting mentions in the text that match the attribute values from each candidate record and generating a score for each candidate record based on the mentions to the attribute values from the candidate record.

The auto filing method may further include linking the document to an entity based on the scores generated for the candidate records. A document can be automatically filed to a workspace based on the linking. In some embodiments the document may be classified based on document type and automatically filed to a folder of the workspace based on the document type.

Another embodiment includes a method for filing a document in an enterprise content management system. One embodiment includes maintaining a database of enterprise content management system (ECM) information including a plurality of enterprise workspaces having attributes. A knowledge graph comprising a plurality of nodes for enterprise workspaces and a plurality of edges for relationships between enterprise workspaces may be generated based on the database of ECM information. The method may further include receiving a document for filing in one of the enterprise workspaces, the document having text. In some embodiments, the document is received from a capture service.

A plurality of indicators may be detected in the document text and evaluated to generate a subset of strong indicators in the plurality of indicators. The knowledge graph can be queried based on the strong indicators to generate a set of candidate enterprise workspaces to store the document. The set of candidate enterprise workspace attributes may be compared to the strong indicators to determine a score of each candidate enterprise workspace. Based on the scores of the candidate enterprise workspaces, the document may be linked to a subject one of the candidate enterprise workspaces.

According to one embodiment, generating the knowledge graph includes querying the database of ECM information to identify enterprise workspaces and assigning each enterprise workspace to a knowledge graph node. Generating the knowledge graph may further include querying the database of ECM information to identify relationships between enterprise workspaces, assigning each relationship to an edge between enterprise workspaces.

The document may be classified by document type. According to one embodiment evaluating the plurality of indicators to generate a subset of strong indicators in the plurality of indicators is based on the document type.

The enterprise workspaces may comprise workspace entities. In one embodiment, detecting a plurality of indicators in the document text comprises detecting document entities to generate a subset of strong indicators in the document entities. Querying the knowledge graph may be further based on the strong indicators to generate a set of candidate enterprise workspace entities. Embodiments may include comparing the set of candidate enterprise workspace entities to the strong indicators to determine a score of each candidate enterprise workspace entity. Linking and storing the document to a subject one of the candidate enterprise workspaces may be based on said scores of the candidate enterprise workspace entities.

According to one embodiment, determining a score of each candidate enterprise workspace comprises generating a count of the number of instances of the strong indicators in each of the enterprise workspace attributes.

Embodiments may also include related systems and computer program products.

Embodiments described herein provide a technical advantage by providing the capability to automatically file documents to a workspace, including documents that have no a priori relationship with an entity, business object, or workspace.

Embodiments described herein provide another advantage by performing entity linking to entities that are not sufficiently well named for NLP techniques.

Embodiments described herein provide another advantage by being tolerant of false positives in earlier stages of indicator extraction, thereby allowing for faster processing of documents than can be achieved by high upfront accuracy capture techniques.

Embodiments described herein provide another advantage by providing intelligent auto filing of documents to workspaces without requiring a large set of training data.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DESCRIPTION

Figure 1:
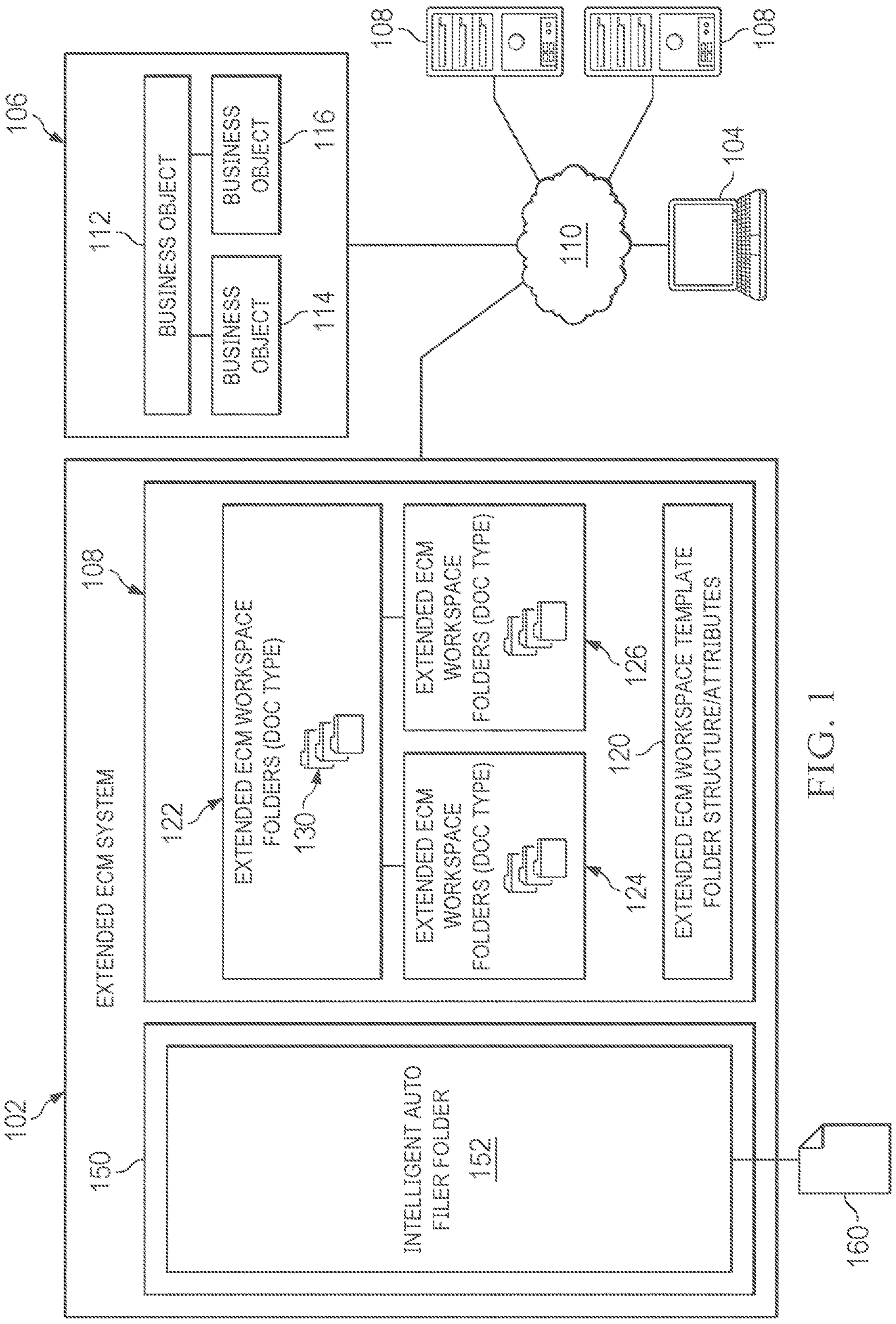
FIG. 1 is a block diagram illustrating an example system operable to intelligently auto file content objects to workspaces.

Embodiments described herein provide mechanisms to intelligently file content objects, including content objects containing unstructured text, in storage locations associated with entities with which, from the perspective of the filing mechanism, the content objects have no a priori relationship.

At a high level, intelligent auto filing comprises an entity linking task. In enterprise management systems, an entity is a physical or abstract object, such as a person, a project, an organization as a business partner, a building, a contract, a business transaction, a plant, an investment, etc., that is distinguishable from other objects and that can be modelled by the system. Entities of an entity type are described by a set of attributes and the properties of entities of the entity type are described by attribute values that populate the attributes for the entity. Within the context of the computer system then, an entity may be represented as a set of attributes that describe the properties of the entity. The entity linking task leverages the attributes of the entities to link text to a particular entity.

According to one embodiment, the entity linking task includes detection/recognition, entity resolution, and linking. The entity detection/recognition phase detects mentions of entities modelled in the system. In the entity resolution phase, ambiguities are resolved. In the linking phase, the text that contains the mention of the entity is linked to the representation of the entity in the system. The linked text can then be filed to a location associated with the entity.

As mentioned above, an extended enterprise content management (ECM) system may include workspaces that integrate content objects and data from enterprise management systems. In some cases, it may be desirable to automatically file content objects, including content objects containing unstructured text, to workspaces. Embodiments of entity linking described herein may be used to automatically file content objects in workspaces of an extended ECM system.

Some extended ECM implementations provide automatic filing of content objects in limited circumstances. For example, content objects generated internally at an extended ECM system or an enterprise management system during a business process in awareness of a relation to a business object (BO) can be automatically filed to the workspace connected to the BO. Further, content objects with an external origin via a channel that links the content objects to a BO (e.g., based on sender) may be automatically filed to the workspace connected to the BO. However, prior extended ECM systems do not automatically file content objects in workspaces when the content objects have no a priori connection to a BO. Embodiments of entity linking described herein may be used to automatically file content objects in workspaces of an extended ECM system. The entity linking-based approach may be used in addition to or as an alternative to other automatic filing techniques. Embodiments described herein can improve the functionality of extended ECM systems (or other computer systems) by providing the capability to automatically file content objects to locations associated with entities. For example, embodiments described herein can automatically file inbound content objects to the appropriate workspace even if the content objects have no a priori connection to the entity represented by the workspace or BO to which the workspace is connected.

There are a variety of techniques that can be used to determine the meaning of unstructured text for classification or other purposes in other contexts. However, these mechanisms have shortcomings with respect to entity linking in the enterprise management context. One possible mechanism for linking text to entities is using natural language processing (NLP). However, current NLP entity linking methods may fall short in the context of auto filing of content objects in extended ECM workspaces for several reasons. First, many of the entity types (or entities thereof) modelled by extended ECM solutions are not well described as named entities in the NLP sense. The entities of such entity types are often not explicitly referenced by a simple name in a text or document. Second, relevant mentions of the represented entities in business documents—especially in-semi structured business documents such as invoices, purchase orders, service sheets—are not typically within the context of natural language sentences. As such, NLP entity linking methods would have difficulty linking many content objects (e.g., documents) to workspaces or other representations of entities. Embodiments described herein provide an approach that addresses the shortcomings of NLP entity linking for intelligent auto filing of content objects to entities by providing the capability to link text to entities, even if the entities are not well named for NLP purposes.

Another potential mechanism to link text to an entity is a high frontend accuracy capture paradigm, which can be described as follows: i) in a first step, extract information from the document as accurately as possible; ii) in a subsequent step, search for a matching record of attributes (i.e., a record that represents and entity) in a database using a record linkage approach. This type of approach requires significant processing to minimize false positives as false positives will result in content objects being filed in the wrong workspaces or too many workspaces. Some embodiments described herein differ from such capture approaches with respect to the error type operating characteristic for the document information capture portion. In this context, the error type operating characteristic refers to the trade-off of type I (false positive) errors versus type II errors (false negative). For an indicator extraction task with respect to a single indicator or indicator type, techniques described herein can accept relatively high false positive rates due to the combinatorics of the indicator multiplicity. This can significantly reduce the difficulty of capture and allow the use of simple generic capture approaches well suited for auto-machine learning (ML) adaptation. It can be noted, however, that some embodiments may utilize NLP entity linking methods, high frontend accuracy capture approaches or other approaches in conjunction with, in addition to, or as an alternative to entity linking techniques described herein.

Turning to FIG. 1, a block diagram illustrating an example system operable to intelligently auto file content objects to workspaces. According to one embodiment, a workspace may be a virtual workspace viewable (e.g., through a graphical user interface of a particular computing device), modifiable, and or engageable by a user that integrates structured business data connected or related according to one or a number of business contexts and content objects, such as documents, containing unstructured data.

The illustrated computing environment of FIG. 1 includes an extended ECM system 102, a client system 104, a remote enterprise management system 106 and additional data systems 108 communicatively coupled through a network 110. Although illustrated as single systems, each of extended ECM system 102, client system 104, and enterprise management system 106 may include more than one system or more than one computing device within a distributed computing environment.

The illustrated remote enterprise management system 106 may be a system, such as an enterprise resource planning (ERP) system, a customer relationship management (CRM) system, a human capital management (HCM) system, a business process management (BPM) system or other system for managing resources or processes of an organization. Enterprise management system 106 comprises BOs (e.g., BO 112, BO 114, BO 116). In general, a business object is an object that represents a business entity—that is, a business object represents a physical or abstract object, such as a person, a project, an organization as a business partner, a building, a contract, a business transaction, a plant, an investment, product, invoice, purchase order, travel request, etc. being managed by the application.

A business object type can be assigned attributes that describe business objects of that type. For example, an employee business object type may specify the attributes that describe employees. The properties of a business object (i.e., an instance of a business object type) are described by the values for the attributes of the business object. For example, an employee business object may hold attribute values that describe an individual employee. A business object can thus hold a set of attributes (names, values) that describe the properties of an entity. In enterprise management system 106, an entity may be represented by the set of attributes of a business object. A business object may also hold associations with (relationships to) other business objects. In some implementations, a business object may also embody behaviors.

Extended ECM system 102 may be implemented as an on-premises content server, in the cloud, or as a combination of on-prem and cloud-based services, or according to other paradigms. Extended ECM system 102 provides workspaces connected to BOs in enterprise management system 106. Extended ECM system provides workspaces connected to BOs. According to one embodiment, extended ECM system 102 comprises workspace templates (e.g., workspace templates 120) for various workspace types. In some embodiments, the workspace types may correspond to the BO types. Workspaces (e.g., workspace 122, workspace 124, workspace 126) can be created based on the workspace templates. A workspace of a workspace type may correspond to BO of the BO type to which the workspace type corresponds. Extended ECM system 102 may have any number of workspace templates and workspaces.

In the illustrated embodiment, a workspace template for a workspace type defines the attributes (e.g., attribute names, data types) that describe workspaces of that workspace type. The workspace template further defines document types for the workspaces of the workspace type. The attributes for a workspace type may include attributes that map or otherwise correspond to attributes of a corresponding BO type. The properties of workspace instances of a workspace type (simply referred to as workspaces) are described by the values for the attributes of the workspace. The attributes of a workspace may include attributes that map to or otherwise correspond to the attributes of a BO. As such, a workspace may include attributes having values populated from a corresponding BO. A workspace can hold a set of attributes (names, values) that describe the properties of an entity. Thus, in extended ECM system 102, an entity may be represented by the set of attributes of a workspace. Or, put another way, in some embodiments a workspace may be considered to represent an entity. In some embodiments, the attribute values that describe the properties of the entity are populated from the corresponding BO. A workspace may also hold associations with (relationships to) other spaces. A workspace may also embody behaviors.

Extended ECM system 102 can automatically generate workspace instances for BOs. A workspace generated for a BO may be connected to BO in that extended ECM system 102 can synchronize attribute data and BO relationships with the workspace. In particular, extended ECM system 102 applies attributes of the BO to the workspace, for example populating attributes of the workspace from the BO's attribute values. Even more particularly, extended ECM system 102 applies the attribute values that describe the properties of the entity from the BO to the workspace.

In the illustrated embodiment, extended ECM system 102 automatically creates workspace 122 for BO 112 (e.g., from a template 120) and populates attributes of workspace 122 with attribute values of BO 112. Similarly, extended ECM system 102 can create workspace 124 for BO 114 and workspace 126 for BO 116. Extended ECM system 102 can maintain relationships between workspaces. More particularly, workspaces in extended ECM system 102 may be related to each other based on relationships between the corresponding BOs. For example, workspace 122, workspace 124, and workspace 126 may be related to each other based on the relationships between BO 112, BO 114, and BO 116.

A workspace may include a folder structure for storing content objects, such as documents, related to the BO. For example, the illustrated workspace 122 includes folder structure 130. From a content storage perspective, workspace 122 may be considered a folder and the folders in folder structure 130 subfolders of the workspace. According to one embodiment, the folder structure is based on the document types specified in the workspace template used to create the workspace. In some embodiments, a folder in a workspace may be associated with a document type such that documents of that document type in the workspace will be stored in that folder.

Extended ECM system 102 may further integrate data from any number of additional data systems 108 (e.g., various enterprise management systems, content management systems or other systems) into the workspaces.

A workspace can thus provide a folder structure for storing content objects relevant to a BO, access to related business objects and transactions, and up-to-date metadata from enterprise management system 106 or other systems. A workspace can thus integrate data from a variety of systems to offer a complete view of a BO in a user-friendly interface that may be accessed by a user (e.g., a user at client computer 104). In some implementations, a workspace and the content objects stored therein can be accessed from a connected enterprise management system via automatically generated links to the BOs. For example, in some embodiments, workspace 122 and the content objects stored in workspace 122 can be accessed from enterprise management system 106 via generated links to BO 112.

Returning to FIG. 1, embodiments of the present disclosure can provide extended ECM system 102 the capability to auto file content objects, such as documents, to the correct workspaces and folders. More particularly, embodiments can provide for intelligent auto filing of inbound content objects that have no a priori connection to an entity. For example, extended ECM system 102 can automatically file an inbound document 160 to workspace 122 even if document 160 has no a priori connection in ECM system 102 to BO 112 or workspace 122.

To this end, extended ECM system 102 includes an intelligent auto filer 150 to file content objects. Intelligent auto filer 150 may include or leverage a number of services for text classification, information extraction, capture, analytics, or other purposes. These services may run on-prem, in the cloud, according to a hybrid paradigm (i.e., utilizing services on-prem and in the cloud) or according to any other paradigm. According to one embodiment, intelligent auto filer 150 comprises an intelligent auto filer folder 152 in which documents for filing are placed.

According to one embodiment, intelligent auto filing uses a knowledge graph-based entity linking approach for intelligent filing. The BOs in enterprise management systems and their relationships can be utilized as one source of an enterprise knowledge graph. More particularly, BOs with their attribute values may be sources for typed nodes of a knowledge graph and the relationships between the BOs may be sources of typed attributed edges of the knowledge graph. For example, BO 112, BO 114, and BO 116 and their attribute values may be sources for typed nodes in a knowledge graph and the relationship between BO 112 and BO 114 and the relationship between BO 112 and BO 116 may be the source of typed attributed edges in the knowledge graph.

Attribute data and BO relationships can be synchronized with workspace data by extended ECM system 102. As discussed above, the attributes of workspaces can be populated from the BOs and the relationships between the BOs may be reflected in workspace relationships. As such, the extended ECM system's workspace data (e.g., attributes and relationships) can be leveraged as a source for a knowledge graph instead of or in addition to the connected enterprise management system 106. This can be advantageous if the extended ECM system integrates with various enterprise management systems as one knowledge graph and intelligent filing implementation can serve for intelligent auto filing of content objects to workspaces linked to BOs at various enterprise management systems.

Intelligent auto filer 150 analyzes document 160 and leverage knowledge of attribute values to detect potential references in the document to the entities modelled by extended ECM system—that is, intelligent auto filer 150 extracts potential mentions of the workspaces or BOs (or entities represented by the workspaces or BOs). In many cases, it is likely that the potential mentions suggest more than one entity. Intelligent auto filer 150 can further evaluate document 160 to resolve ambiguities and identify the particular entity to which the document is related. If the ambiguities can be resolved to identify a particular entity, intelligent auto filer 150 links document 160 links the document to the representation of the entity in the system—for example, links document 160 to the workspace representing the entity. The linked document can thus be filed to the appropriate workspace. Intelligent auto filer 150 may also leverage techniques, such as document classification, to file the document to the appropriate folder in the workspace.

While FIG. 1 only illustrates a small number of BOs and workspaces, the set of BOs and workspaces can be arbitrarily large and complex. A more complex example is provided in FIG. 2, which illustrates one example of some BO types with their relationships. In this example, the BO types include a Business Entity type 202, a Building type 204, a Rental Object type 206, a Property type 208, a Contract type 210, reside in a real estate management system and a Business Partner type 212 resides in an ERP system. Each business object type can define a set of attributes for business objects of that type and each instance of a business object type—that is, each BO—will have attribute values describing the properties of an entity (e.g., a business entity, a building, a rental object, a property, a contract, a business partner).

Figure 2:
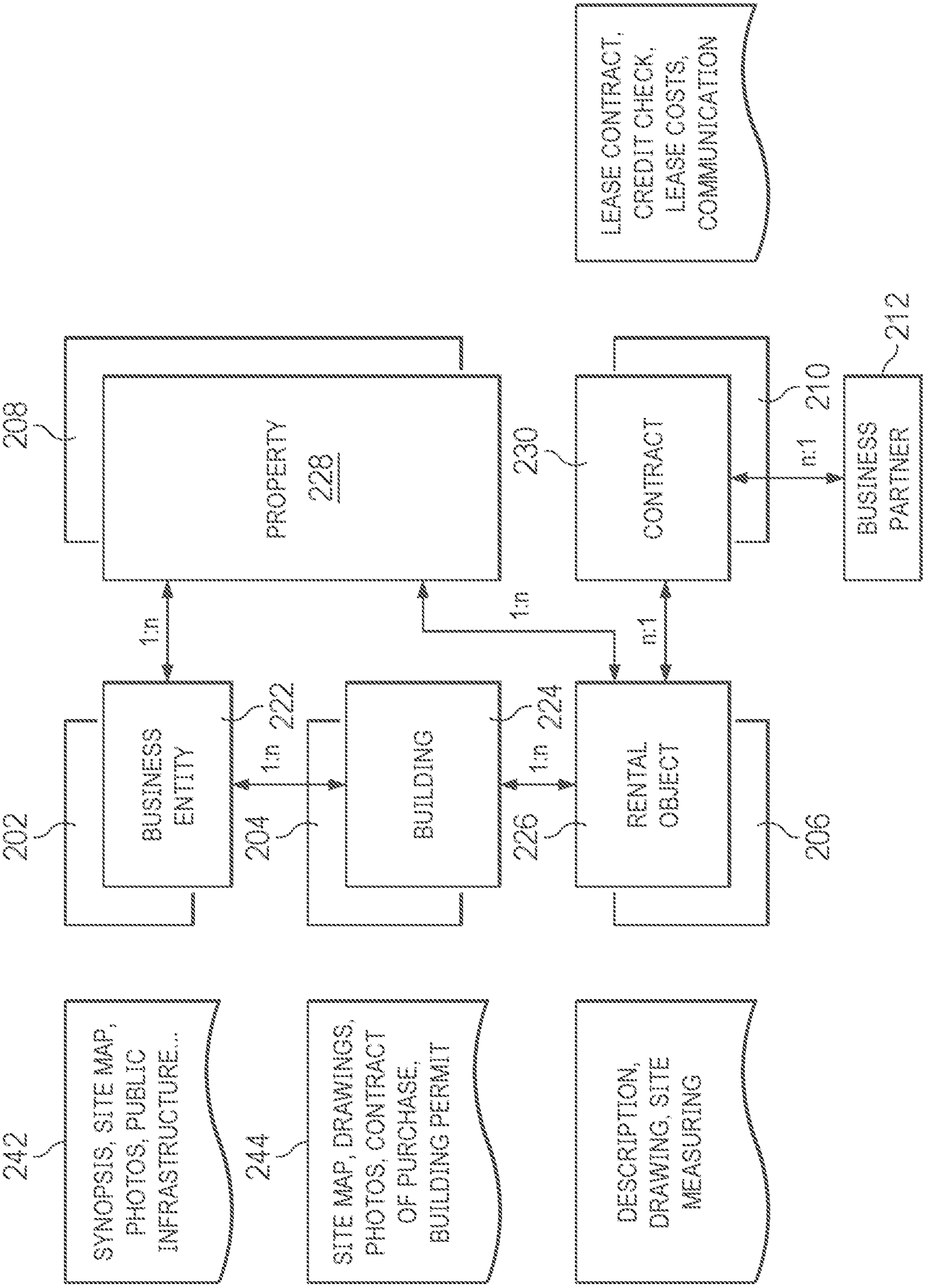
FIG. 2 is a diagrammatic representation of one embodiment of a set of business object types and corresponding workspace types with related document types.

Further FIG. 2 reflects that the extended ECM workspace types connected to the BO types can include a Business Entity type 222, a Building type 224, a Rental Object type 226, a Property type 228, and a Contract type 230. In some embodiments, there may also be a workspace type for Business Partner. Each workspace type can define a set of attributes for workspaces of that type and each instance of a workspace type—that is, each workspace—will have attribute values describing the properties of an entity (e.g., a business entity, a building, a rental object, a property, a contract, a business partner).

Further, a set of document types 242 is specified for the Business Entity workspace type 222. Similarly, a set of document types 244 is defined for the Building workspace type 224. Example document types for other workspace types are also illustrated. Workspaces of a workspace type can include a folder structure to hold documents of the document types specified for the workspace type.

Workspaces of the workspace types can be connected to business objects of the business object types. For example, a Business Entity workspace (an instance of the Business Entity workspace type 222) can be created for and connected to Business Entity BO (i.e., an instance of the Business Entity business object type 202). The attributes of the Business Entity workspace can be populated with values from the corresponding attributes of the Business Entity BO. The Business Entity workspace can further include folders to hold documents of various document types (e.g., synopsis, site map, photos, public infrastructure documents) related to Business Entity BO.

The relationships of the extended ECM workspaces of the workspace types will reflect the relationships of the business objects of the business object types. For example, if a Business Entity object is related to a Building object, the Business Entity workspace created for that Business object will be related to the Building workspace created for the Building object.

In practice, an extended ECM system may comprise any number of workspaces of each workspace type representing a potentially large number of entities. Some of the difficulty of automatically filing documents can be seen with FIG. 2. BOs such as Business Entity BOs, Building BOs, Rental Object BOs, Property BOs and Contract BOs, are often not named entities in the NLP sense. That is, they are not typically explicitly referenced by a simple name in a text or document. Moreover, relevant mentions of these entities in business documents are typically not within the context of natural language sentences. Consequently, it may be difficult to use existing NLP methods (at least alone) to link text, particularly unstructured text, to the BOs or the workspaces connected to the BOs.

Figure 3:
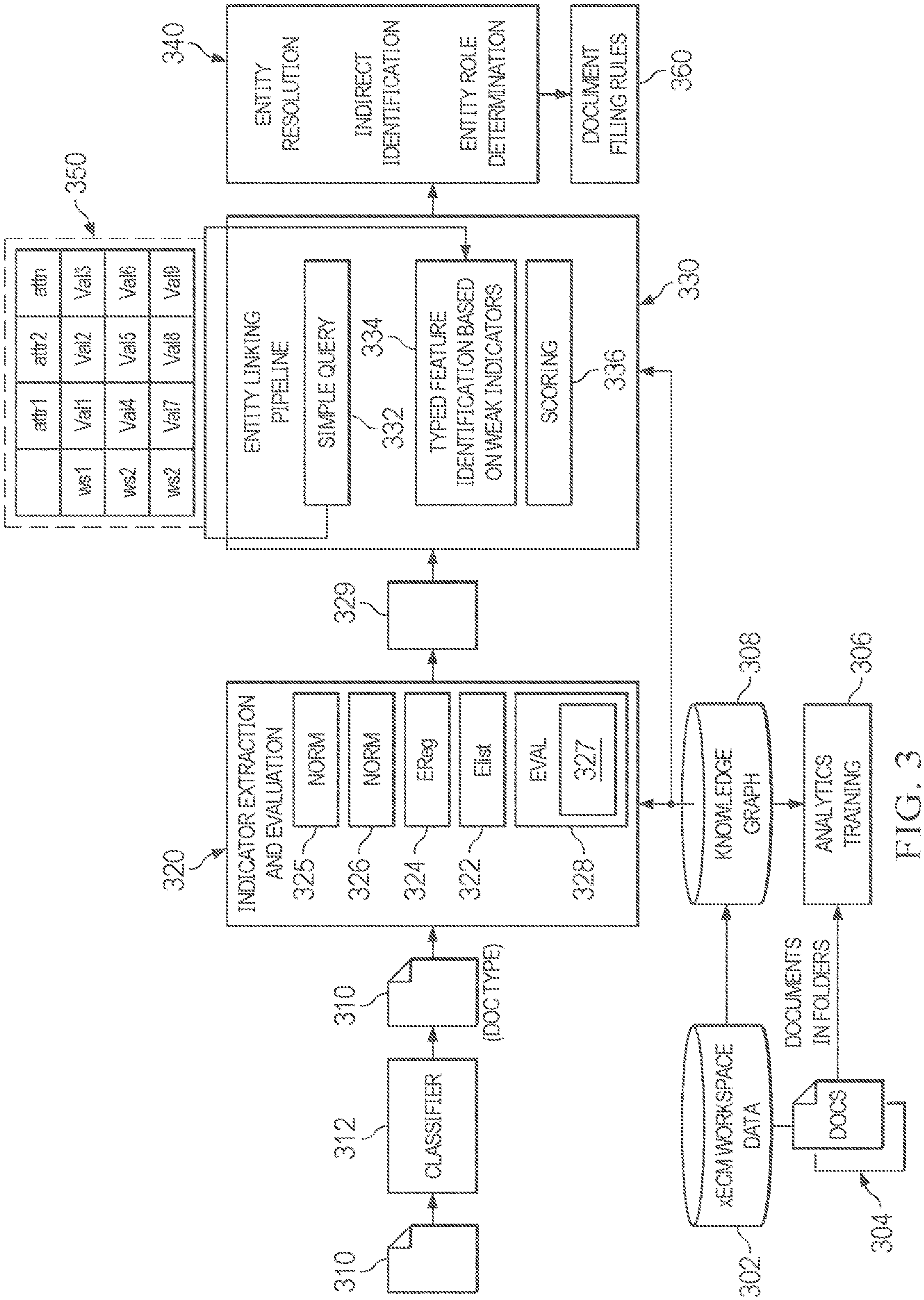
FIG. 3 is a diagrammatic representation of one embodiment of auto filing a document to a workspace.

FIG. 3 is a block diagram illustrating one embodiment of processing a document 310 by an intelligent auto filer (e.g., intelligent auto filer 150) to intelligently auto file the document to a workspace (or other container associated with an entity). In the illustrated embodiment, an extended ECM system (e.g., extended ECM system 102 of FIG. 1) maintains a database 302 of ECM information including, for example, attributes describing the properties of workspaces attributes (including, e.g., attributes that describe the properties of entities), document types, and content objects stored in the folders of the workspaces (e.g., documents 304 stored in the folders of the workspaces).

In the embodiment of FIG. 3, intelligent auto filing uses a knowledge graph-based entity linking approach for intelligent filing. ECM data from database 302 can be used to generate a knowledge graph 308. As discussed, ECM data can embody the workspaces, including the workspace attributes and relationships. According to one embodiment, workspaces with their attribute values may be sources for typed nodes of knowledge graph 308 and the relationships between the workspaces may be sources of typed attributed edges of the knowledge graph 308. Thus, knowledge graph 308 may similarly represent the set of entity relationships represented by the workspaces. For example, each node of the knowledge graph may hold the attributes describing the properties of an entity modelled by the system and each edge may represent a relationship between entities.

The workspace attributes and relationships can form an initial source for knowledge graph 308, but the knowledge graph can be extended by information or knowledge from other sources. For example, the knowledge graph can be extended from external sources that provide knowledge on specific business objects, such as BOs that relate to public entities like organizations (business partners), locations, products. Another example source to extend the knowledge graph is the information extracted from previously filed documents and the filing process of the for document, such information from manual keying of document metadata.

In the illustrated embodiment, the processing of document 310 takes place in four primary phases: a classification phase, an indicator extraction and evaluation phase, a candidate record assembly phase and an entity linking with candidate evaluation phase. In the classification phase, the text of document 310 is analyzed by a machine learning classifier 312 trained to recognize document types (e.g., as trained by analytics training 306 or another component). As such, document 310 can be classified according to a document type.

A staged approach with indicator extraction and entity linking can be used when determining the workspace to which to file the content object. According to one embodiment, this staged approach to link text to an entity is performed at runtime in three overall steps: indicator extraction, candidate record assembly (e.g., database query, knowledge graph query), and entity linking with candidate evaluation.

An indicator is a potential mention in a document that corresponds to an attribute value that may indicate that the document refers to the entity modelled in the system (e.g., an entity represented by a workspace or BO). An indicator that corresponds to an attribute value of workspaces of a workspace type may be referred to as an indicator of or an indicator for the workspace type (or entity type represented by the workspace type).

According to one embodiment, the indicator extraction phase 320 detects indicators of various types in the document (e.g., document 310), evaluates the list of indicators detected and, in some embodiments, selects a sub-list with the goal of controlling the number of expected candidates for candidate record assembly. The sub-list is used by entity linking pipe 330 to query the knowledge graph 308 or database 302 for entities—more particularly, the workspaces or objects that represent the entities—with attributes (type, value) corresponding to the detected indicators, where type in (type, value) is the name of the attribute. The candidate entities are then evaluated to determine if the document can be linked to a particular workspace in an entity linking with candidate evaluation phase.

Returning to indicator extraction phase 320, this phase attempts to detect indicators in document 310. According to one embodiment, indicator extraction phase 320 supports multiple types of indicators. Indicators may be developed using the attribute values of workspaces of a workspace type.

One non-limiting example of an indicator type is a value-list indicator type. The value-list indicator type may be used for attribute types with no specific underlying structure definition that is sufficient to identify potential mentions in the document text. For example, a "Surname" attribute may have values with no underlying structure definition that is sufficient to identify potential mentions in the document text because almost every string of letters with length >=2 (and <=?) may be the surname of some person. According to one embodiment, then a value-list indicator may be defined for the Surname attribute, with the value list including all the name values, or some subset thereof, from the Surname attribute from the workspaces having the Surname attribute. In the example of FIG. 3, a value-list indicator 322 associated with the Surname attribute may thus include a list of surname values from the workspace attributes against which to evaluate the text of document 310. If any of the values specified by value-list indicator 322 are detected then an indication of the detected indicator is added to a list of detected indicators for document 310 (e.g., if "Jones" is the value list and "Jones" is detected, the detected indicator (Surname, Jones) can be output. A value-list indicator 322 may result in multiple values being detected in a document and, hence, multiple detected indicators being output for the document (e.g., (Surname, Jones), (Surname, Smith) . . . ). Indicator extraction phase 320 may apply any number of value-list indicators.

Another example of an indicator type is a structure type, such as a regular expression (regExp) indicator type for matching text that satisfies a regular expression. (e.g., regExp indicator 324). According to one embodiment, a regExp describing the attribute values for an attribute is generated from the list of values. If the intelligent auto filing detects text in a document that matches the regular expression, then it can output a detected indicator (e.g., if the text AB1-123 matches a regular expression for the Employee_ID attribute, the detected indicator (Employee_ID, AB1-123) can be output).

Additional or alternative indicator types may be supported. For example, some embodiments may support a single value indicator (e.g., a list-value indicator with only one value in the list). Further, indicators can be defined for standard types of data, such as social security numbers, credit card numbers or data.

According to one embodiment, intelligent auto filing detects strong indicators in the indicator extraction phase 320. The system considers several aspects when determining strong indicators to detect.

In general, a strong indicator corresponds to an attribute value that only a relatively few workspaces have. In document types exchanged between parties in the context of transactional business processes, attributes that can serve for strong indicators are fairly common. Examples that are often strong indicators include, but are not limited to, employee IDs, tax numbers, social security numbers, file numbers, bank account numbers, person names, street names. A strong indicator that corresponds to an attribute value of an attribute of workspaces of a workspace type may be referred to as a strong indicator of or a strong indicator for the workspace type (or entity type represented by the workspace type).

As mentioned above, the defining property of a strong indicator is that it corresponds to an attribute value that only a few workspaces share. In some embodiments, the attribute values in database 302 or knowledge graph 308 can be evaluated to determine the attribute values shared by relatively few workspaces overall or relatively few workspaces of a workspace type. Moreover, if there is a large sample of documents correctly filed to workspaces, machine learning techniques can be used to determine the attributes that strongly indicate a correspondence between a document of the document type and a workspace, such that a strong indicator can be defined using the attribute values of the attribute across workspaces. Various rules can be used to define strong indicators, such as a maximum number of workspaces that can share a corresponding attribute value or a maximum percentage of workspaces that can share a corresponding attribute value. In some embodiments, strong indicators may be determined using machine learning techniques.

An indicator may correspond to multiple attribute values. Such an indicator may be considered a strong indicator if each attribute value to which it corresponds is shared by only a few workspaces. For example, a list-value indicator can be considered a strong indicator if each of the values in the list corresponds to an attribute value that is shared by only a few workspaces. In some cases, an indicator may be considered a partially strong indicator. For example, some attribute values for an attribute may be shared by only a few workspaces, while other values may be shared by more workspaces. As an even more particular example, many workspaces may share some default or n/a value for an attribute while other workspaces have values for the attribute that are only shared by a few other workspaces. The values shared by many workspaces can be ignored, while the attribute values shared by only a few workspaces can be used as partial strong indicators to the workspace instances having attributes with the non-ignored values.

According to one embodiment, a content object must contain at least one mention (or some other defined minimum number of mentions) of a strong indicator to the entity in order for the content object to be successfully linked to the entity.

Preferably strong indicators are selected so that they are relatively easy to detect in a document. For example, it may be preferable to select strong indicators that can be normalized using a general normalization scheme and can be detected using simple string compare operations or other simple operations. General normalization may include, for example, normalizations that may be applicable to any attribute (or a significant portion of attributes), such as normalizing to upper case, character replacements for umlauts or accents or special characters, or other such normalizations. More specific normalizations may be applied in subsequent steps, such as when candidate records are evaluated for weak indicators or other indicators. More specific normalizations may include, for example, normalizations based on the data type, such as normalizing dates.

In a given implementation, there may be a great many strong indicators to a great many entity types. Indicator extraction phase 320 may implement rules to limit the strong indicators that it will attempt to detect in a document. According to one embodiment, indicator extraction phase 320 selects the strong indicators to attempt to detect based on the document type (or other classification) assigned to document 310 the classifier 312. Indicator extraction phase 320 can take advantage of the fact that workspace types define what doc types will be associated with the workspaces of the workspace types in some embodiments. Indicator extraction phase 320 may, for example, select to apply only those indicators that are strong indicators for the workspace types that include the document type assigned to document 310 and ignore the other indicators when performing indicator extraction.

Moreover, in many use cases there will be several candidates for strong indicators for an entity type. It may differ from document type to document type which indicators may be expected to be mentioned on the documents of that type. This may be determined, for example, from analysis of the ECM information (e.g., in database 302) by machine learning or other techniques. As such, indicator extraction phase 320 may ignore strong indicators for an entity type that are not expected to appear in document 310 based on the document type assigned to document 310 by the classifier.

Indicator extraction phase 320 may evaluate the text of document 310 against a number of (strong) indicators of various types to detect strong indicators in document 310. For a value list indicator, the intelligent auto filer may generate a directed acyclic word graph (DAWG) from the set of attribute values in the value-list indicator. The acyclic word graph can be used to perform efficient detection at runtime of mentions in the text of document 310 of the attribute values. According to one embodiment, a DAWG accepts a normalized string of document text and maps the string to a normalized attribute value. For candidate record searches, the unnormalized attribute value may be used. Thus, in some embodiments, the unnormalized attribute values may be associated with the normalized attribute values in the DAWG. Thus, the reverse transformation to the unnormalized attribute values may be encoded in the DAWG.

Certain attribute values may be omitted and not represented in the directed acyclic word graph. For example, values that are shared by too many entity instances (attribute values that are shared by too many workspaces) can be omitted from the acyclic graph. Additionally, attribute values that lead to too many false positives may be omitted. For example, while "The" is a valid surname, and may appear as a value for the Surname attribute in only a small number of workspaces, it may be preferable to omit it from the value list (or acyclic graph) for the Surname attribute because it would likely lead to many false positives as the word "the" appears in almost every English language document.

The number of entities (as represented by workspaces) that share an attribute value may be calculated and coded into the directed acyclic word graph data structure for every attribute value represented in the graph. For example, if the value "Jones" is included in the value-list indicator generated for the Surname attributed, then the number of workspaces that have the attribute Surname with the value "Jones" can be encoded in the acyclic graph for the attribute value. This information can be evaluated to select a sub-list of indicators with the goal of controlling the number of expected candidates in the candidate record assembly step.

The structure indicator type (e.g., regExp indicator 324) is used for attribute types that have an underlying defined structure that may be sufficient to identify mentions in the document texts. A regExp describing the attribute values is generated from a list of attribute values. As with the value list strong indicators some values may be omitted (for example, explicitly excluded via the regExp). A 'hitcount' average value can be calculated in order to support selecting a sub-list of attribute values to limit the number of expected candidates.

In many cases, information within the text of the document 310 is formatted (or coded) differently than attribute values of the workspaces. Normalization of both document text and workspace attribute data can facilitate the indicator detection and entity linking processes. The indicator detection process may involve comparing a great many attribute values to the text of document 310. Say for example, a strong indicator is Surname, and an organization has employees with 10,000 different surnames, then the indicator detection process may involve attempting to detect 10,000 surnames to the text of document 310. It may be desirable then, to use a fairly general normalization process for the text and attribute values for indicator detection.

In general, some coordinated normalization can be applied to the text of a document and the attribute values. In operation then, the text of document 310 is normalized (block 325) and the attribute values being used as strong indicators are normalized (block 326). According to one embodiment, the normalization for attribute values for indicator extraction is performed during the generation of the acyclic word graphs or the regExps for the respective strong indicator types. The normalization can support fast and easy detection of strong indicators in the document. For example, based on these normalizations the detection of mentions to strong indicators can be performed by simple string-compare operations in some embodiments. If a reverse transformation is needed for database lookup in subsequent steps, the reverse transformation may be coded into acyclic word graphs and regExps.

The indicator extraction phase 320 analyzes the (normalized) text of document 310 for text that matches a (normalized) attribute value in the acyclic graph for a value list indicator type (e.g., the acyclic word graph generated from value-list indicator 322). If the strong indicator is detected in the text of document 310—that is, a string of text matches an attribute value represented in the acyclic graph—the strong indicator (indicator type, indicator value) can be added to a list of indicators detected for the document. For example, if the strong indicator generated for the Surname attribute includes the attribute value "Jones," and "Jones" is found in the document text, then (Surname, Jones) can be added to a list of strong indicators detected in the document text. In addition, the number of entities (e.g., as represented by workspaces) that include the attribute Surname with the value "Jones" may be indicated.

Similarly, the text of document 310 can be analyzed for text matching the pattern specified in a structural indicator for an attribute. For example, the indicator extraction phase 320 can search the normalized text of document 310 for text that matches the pattern specified in regExp indicator 324. If text matching the expression is found, the text can be added to the list of strong indicators detected. For example, if a regular expression is generated for the attribute Employee_ID, and the text AB1-123 matching the expression is detected, the strong indicator (Employee_ID, AB1-123) may be added to the list of strong indicators detected in the document. In addition, a hit count can be provided for the detected strong indicator if there are multiple instances of the same string in the document.

Various techniques may be used for analyzing the text of document 310 for text matching attribute values and regular expressions. In one embodiment, a sliding window approach is used in which a sliding window of text from document 310 is evaluated.

Thus, indicator extraction phase 320 generates a list of indicators 327 of entities detected in the text of document 310. In some embodiments, the list of indicators 327 is evaluated (block 328) to determine a sub-list of indicators 329. This can be done to reduce the number of candidate records. According to one embodiment, the sub-list of indicators 329 includes the indicators that give the strongest indication of a workspace or entity. More particularly, according to one embodiment, the sub-list of indicators 329 includes the indicators that have the following characteristics: a) low likelihood for false positives; b) indication to only few candidate records. According to one embodiment, a rule selects the indicator values for which the number of records containing the corresponding attribute value is below a threshold and that maximize the total relevance weight of the selected list of indicator values (e.g., based on the document type).

In the candidate record assembly phase, the extended ECM system uses the detected strong indicators (e.g., list of strong indicators 327 or reduced list of strong indicators 329) to determine entities that match the detected strong indicators. According to one embodiment, the list of indicators (type, value) is used in entity linking pipe 330 (block 332) to query knowledge graph 308 or database 302 for entities—or more particularly, workspaces that represent entities—with corresponding attributes (type, value). In one embodiment, the strong indicators are joined by the "or" operator in this query. For example, if the strong indicators (Surname, Jones) and (Employee_ID, AB1-123) are detected in document 310, the query can be: {(Surname=Jones) OR (Employee_ID=AB1-123)}. In some embodiments, the query can be extended to an "or" of indicator tuples and combined with an "and." Other rules for querying the data based on detected indicators may also be implemented.

From the query, a result of candidate records 350 is created. Each candidate record may be a record for a candidate entity (workspace) and includes attribute values for the corresponding workspace. The candidate records can contain attributes (type, value) that correspond to the detected strong indicators and attributes (type, value) for additional attributes. In one embodiment, the result of candidate records 350 can be formatted as a table with each row representing a workspace/entity, each column representing an attribute, and each cell representing an attribute value. Weak indicators can be selected where the weak indicators correspond to the attribute values returned, in particular to attribute values that do not correspond to the detected strong indicators.

At block 334, the entity linking pipe 330 detects all mentions in the text of document 310 that corresponds to a cell in the candidate record table. In other words, for each workspace attribute value returned in the result of candidate records 350, the intelligent auto filer analyzes the text of document 310 to determine if there is a match. According to one embodiment, the attribute values of the result candidate records can be normalized such that the detection can be performed as simple string comparisons. If a general normalization is not sufficient, a specific normalization can be configured per indicator type to be applied during entity linking. Since, at block 334, only a small number of attribute values have to be evaluated, such more specific normalization of attribute values will have less impact on runtime performance than if more specific normalization occurred for indicator extraction. In other embodiments, any suitable normalization known or developed in the art can be applied at the indicator extraction phase or entity linking.

The entity linking pipe 330 scores the candidate records (block 336). According to one embodiment, the input for scoring for a candidate record can be a vector with values per cell (e.g., per attribute value) of the candidate record, such as 1 if a mention matching the value of the cell is found in the text of document 310 (i.e., 1 for a positive case) and a 0 if no mention matching the value of the cell is found (i.e., 0 for a negative case). In some embodiments, different weights may be applied for the positive (1) case and the negative (0) case. In some embodiments, the score for a record is determined by a summation of the positive weights—that is, the weights corresponding to the positive cases (mentions matching values from the record). Other scoring functions may also be applied, such as, but not limited to, scoring functions trained via machine learning technologies. Weights for each cell or attribute may be determined by various mechanisms known or developed in the art. According to one embodiment, the weights may be determined using a set of sample documents labeled with a target workspace to derive a set of weights that best model linking the sample documents to the target workspace.

Beyond the automatic filing to subfolders of workspaces, the classification by document type can be leveraged to optimize scoring of the workspaces. In an HR scenario, for example, it may be expected to find a social security number of the employee for some document types for others not. This type of knowledge can be leveraged within the scoring for the indicator-based entity linking. For example, in some document types the indicator social security number can be counted with significant weight and, for other document types, the indicator social security number can be considered with less weight. Thus, the weighting applied to attribute values of an attribute type may depend on the document type assigned to document 310.

Selecting the workspace for filing may be considered a labeling problem where each candidate record represents a classification (possible label). A confidence score is calculated per candidate record, where the confidence score for a candidate record indicates a confidence that the document should be labeled with or assigned to the workspace corresponding to that candidate record. Any suitable method known or developed in the art for calculating confidence values for labels/classifications may be used. According to one embodiment, the absolute scores of the candidate records and the distribution of scores among the records are considered for the calculation. As will be appreciated, the confidence score techniques may use various parameters. The parameters may be optimized by applying machine learning to a set of sample documents labeled with target workspaces. According to one embodiment, if the confidence score for a record is above threshold the candidate is selected for the linking to that candidate record.

If the confidence score indicates that the document is linked to more than one entity, entity resolution may be performed (block 340). In many cases the document type can be used to determine the primarily relevant entity type for the intelligent filing entity linking task. References in the document to entities of other types may be leveraged in a supportive manner via workspace relationships (e.g., as embodied in knowledge graph 308) in two ways: entity resolution and indirect entity detection. For example, if an attempt to file a document to a workspace of type rental object in the above real estate solution example, it could help to identify a mention of a business partner in the tenant role on the document. This could be done to either resolve potential ambiguities with respect to direct mentions of a rental object or in case no direct mention of a rental object could be detected, to indirectly identify the rental object via the contracts of the detected tenant.

Extended ECM workspaces can contain a folder structure for content object filing. As discussed above, the folders of an ECM workspace may be associated with various document types. A set of documents filing rules 360 can determine the target folder per document type for a document (or other content object) which has a known or determined relationship to a workspace. According to one embodiment, the intelligent auto filing performs automatic document classification in order to support the filing to folders within a workspace based on the rules. Intelligent auto filing can leverage adaptive classification technology.

In one embodiment, an analytics training component 306 automatically trains the adaptive classification technology using samples of documents (e.g., documents 304) previously filed to folders of extended ECM workspaces.

The analysis tool may comprise assistants to automatically adapt and optimize the configuration of the auto file (e.g., using machine learning). Over time the set of assistants can be extended, and the performance of the assistants can be optimized to approach the goal of perfect auto configuration over time. Examples of assistants include but are not limited to training of the document classification (e.g., training classifier 312), generating regExp for strong indicator extraction from an attribute value data set; detecting potential strong indicators from the list of available workspace attributes; optimizing entity linking scoring (e.g., optimizing block 336); optimizing entity linking result generation—confidence value; optimizing text and attribute value normalization.

In many cases, the overall task of intelligent filing to workspaces may not be well suited to deep learning techniques because the available training data sets for a specific scenario may be too small compared to the complexity of the task (degrees of freedom). Approaches to intelligent filing as described herein can be implemented without the need for large training sets. The subtasks related to the intelligent auto filing however, may be suited to machine learning approaches. Thus, over time end-to-end machine learning for a high accuracy intelligent filing solution can be achieved by adding and optimizing ML algorithms for the various subtasks. Auto ML approaches will be leveraged in the analytics training component 306 to optimize the configuration.

Figure 4A:
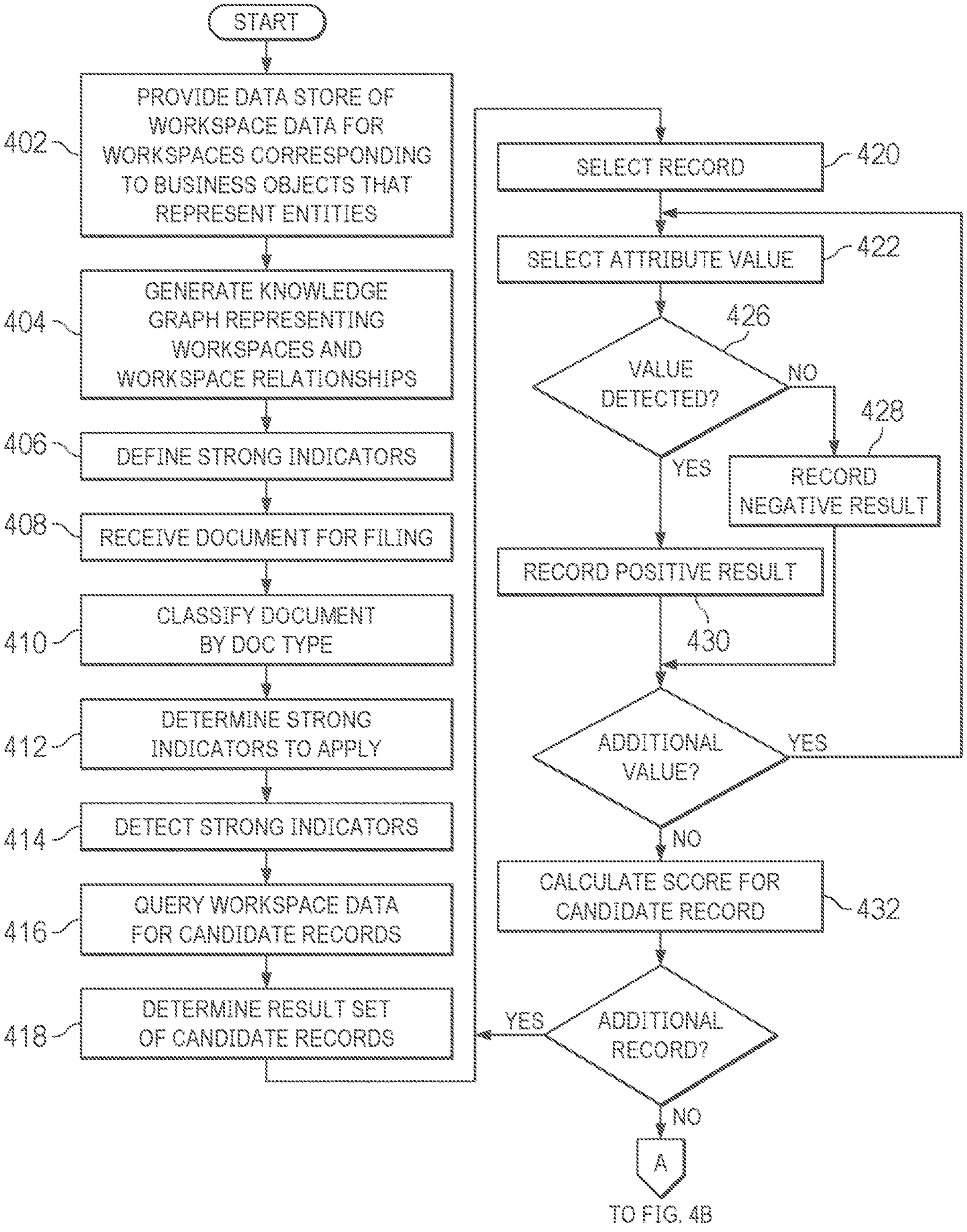
FIG. 4A and FIG. 4B are a flow chart illustrating one embodiment of a method for auto filing of documents to workspaces.
Figure 4B:
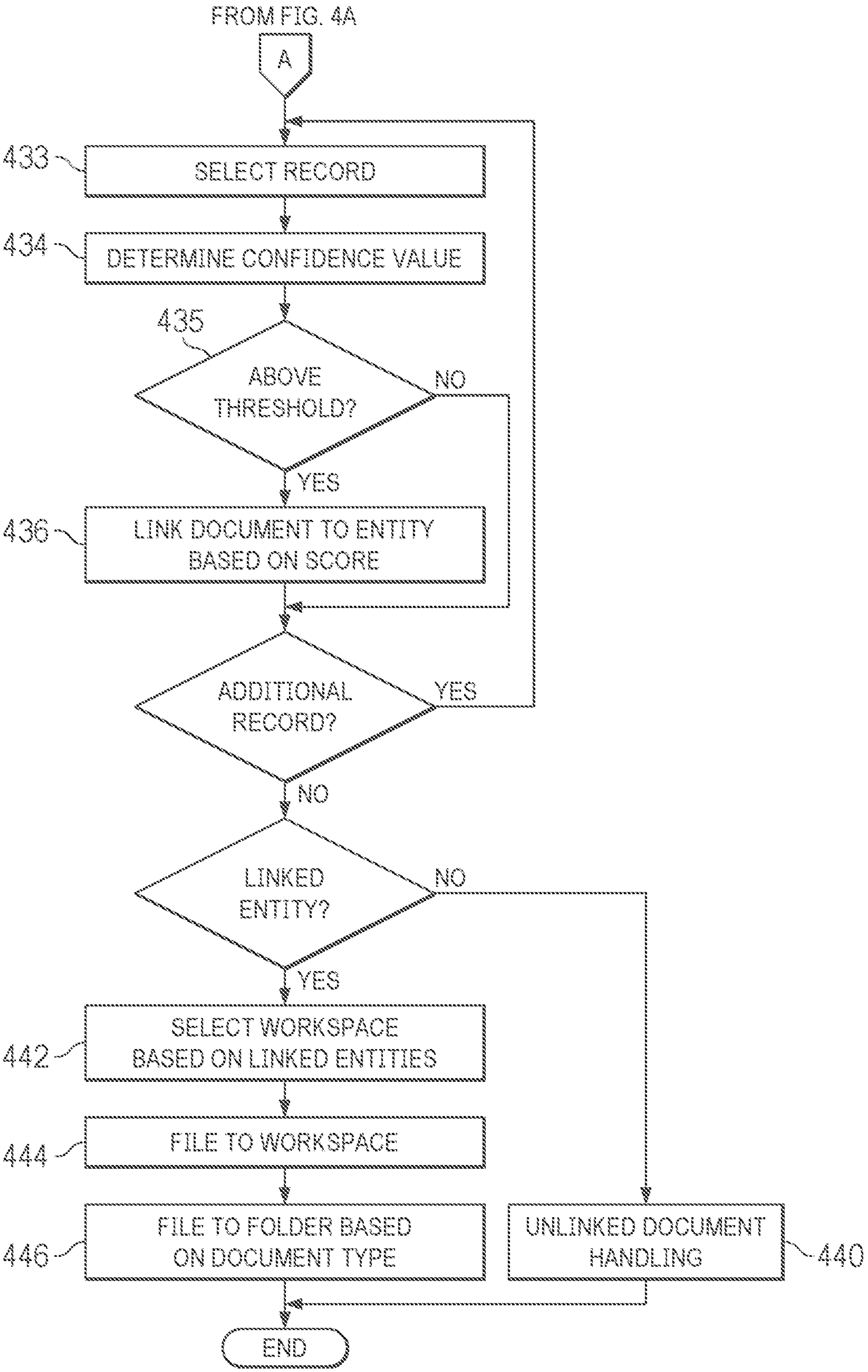

FIG. 4A and FIG. 4B are a flowchart illustrating one embodiment of a method for intelligent auto filing of documents to workspaces (FIG. 4A and FIG. 4B are referred to collectively as "FIG. 4"). The method of FIG. 4 may be implemented through execution of computer readable program code embodied on a non-transitory computer readable medium. According to one embodiment, one or more steps of FIG. 4 may be performed by an intelligent auto filer (e.g., intelligent auto filer 150 of FIG. 1). At step 402, a datastore, such as a database or other data store, including a set of workspace data is provided. The set of workspace data may comprise attribute values and relationships for a plurality of workspaces in a content management system. Each workspace may be connected to or otherwise correspond to a business object in an enterprise management system. The business objects can represent entities and thus the attributes of a workspace can include attributes that represent the properties of the entity represented by the corresponding business object.

A knowledge graph can be generated from the set of workspace data (step 404). The knowledge graph can comprise attributed nodes representing the workspaces in the plurality of workspaces and edges representing the relationships.

Strong indicators of entity types can be specified (step 406). As discussed above, a strong indicator of an entity type can be an indicator that corresponds to an attribute value shared by relatively few entities of the entity type (i.e., shared by relatively few workspaces of the workspace type).

The intelligent auto filer receives a document for filing (step 408). According to one embodiment, the intelligent auto filer includes or monitors an intelligent auto filer folder for documents and processes documents added to the folder. In some embodiments, the documents are received as pure text extracted from the document by prior processes.

If the document does not have an associated document type, the document can be processed by a classifier and assigned a document type (step 410). According to one embodiment, the classifier may be a machine learning classifier trained on a training set of document types to classify documents according to document type.

The auto filer selects strong indicators to detect in the document text (step 412). In some embodiments, the strong indicator is selected based on the document type. Indicator extraction phase can take advantage of the fact that workspace types define what doc types will be associated with the workspaces of the workspace types in some embodiments. The auto filer may thus select to apply only those indicators that are strong indicators for the workspace types that include the document type assigned to the document and ignore the other indicators when performing indicator extraction.

The auto filer analyzes the text of the document to detect strong indicators (step 414). As discussed, the attribute values corresponding to the strong indicator and the document text may be normalized for indicator extraction. If a strong indicator is detected the auto filer outputs an indicator (type, value) to a list of strong indicators detected for the document.

In one example, if the selected strong indicator is a value-list containing attribute values the intelligent auto filer may utilize an acyclic word graph generated from the set of attribute values in the value-list indicator. The acyclic word graph can be used at runtime to perform efficient detection of mentions in the text of the attribute values. The auto filer attempts to detect each value in an attribute value list in the text and, for each value detected, outputs an indicator (type, value) to a list of indicators for the document. The auto filer may also output a number of workspaces that share the attribute value.

In another example, the auto filer attempts to detect values that match a regular expression for an attribute. Each match to the regular expression from the text of the document can be added to the list of strong indicators detected, in some cases with a hit count.

In some embodiments, the auto filer may cull the list of strong indicators that were detected based on various rules to reduce the number of strong indicators used to query candidate records in subsequent steps.

For each strong indicator detected (and not culled in some embodiments), the auto filer queries the set of workspace data for workspaces with the workspace attribute value corresponding to the detected strong indicators (step 416). According to one embodiment, querying the set of workspace data comprises querying the knowledge graph generated at step 404. Based on the query, a result set of candidate records is determined (step 418). Each candidate record in the result set of candidate records may correspond to a corresponding workspace and include a set of attribute values from the corresponding workspace.

The candidate records are used to perform additional analysis of the document text. For a candidate record (e.g., as selected at step 420), each attribute value from the candidate record can be selected (step 422) and the document text analyzed to determine if there is a mention of the attribute value (step 426). The attribute value and document text may be normalized for the detection step 426. If the value is not detected, a negative result can be recorded (step 428). If the value is detected, a positive result can be recorded (step 430).

The auto filer uses the negative and positive results determined for the attribute values from a candidate record to determine a score for the candidate record (step 432). According to one embodiment, the input for scoring for a candidate record can be a vector with values per cell (e.g., per attribute value) of the candidate record, such as 1 if a mention matching the value of the cell is found in the text of the document and a 0 if no mention matching the value of the cell is found. In some embodiments, different weights may be applied for the positive (1) case and the negative (0) case. Steps 420-432 can be repeated for each record in the result set of candidate records to generate scores for the result set of candidate records.

A document can be linked to a workspace based on the scores for the result set of candidate records. According to one embodiment, a candidate record is selected (step 433) and a confidence value is determined for the candidate record based on the score for that candidate record and the distribution of scores for the result set of candidate records (step 434). The score can be compared to a threshold (step 435) and if the score is above a threshold, the candidate record can be linked to the entity represented by that candidate record—for example, by being linked to a workspace representing the entity (step 436). Steps 434-436 can be repeated for each candidate record.

If the document is not linked to any entities at step 436, the document can be indicated for unlinked document handling (step 440). For example, the document may be indicated for manual filing.

If the document is linked to at least one entity, a workspace may be selected for filing (step 442).

If the document is linked to only one entity at step 436, the workspace representing that entity may be selected as the workspace to which to file the document. If the document is linked to multiple entities, various rules may be applied to select a workspace. By way of example, but not limitation, the workspace representing the entity for which the highest confidence score was determined for the document may be selected. The auto filer files the document to the selected workspace (step 444). In some embodiments, the document is filed to a folder of the workspace based on the document type (step 446).

FIG. 4 is provided by way of example and not limitation. Various steps may be repeated, steps performed in different orders, steps omitted, and additional or alternative steps performed.

Figure 5:
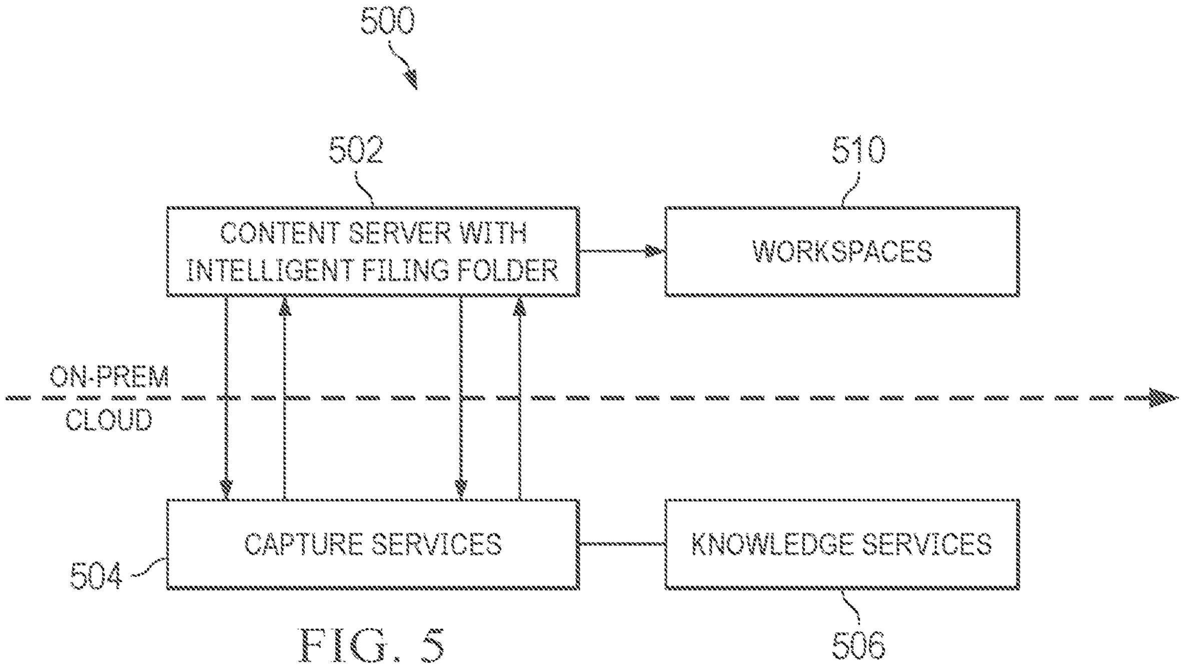
FIG. 5 illustrates one embodiment of an extended content management environment.

FIG. 5 is a diagrammatic representation of one embodiment of a system 500 for intelligent auto filing of documents. In the embodiment illustrated the system includes an on-prem content server 502 and a set of cloud services. The on-prem content server provides workspaces connected to business objects in an external enterprise management system (not shown). Content server 502 can include an intelligent filing folder. When a document is placed in the intelligent filing folder, or at the occurrence of another defined event, the on-prem content server 502 can process the document for auto-filing. According to one embodiment, the on-prem content server makes a call to capture service 504 and provides the document to capture service 504. Capture service 504 extracts the document text from the document and provides the document text to knowledge service runtime 506. Knowledge service runtime 506 performs indicator extraction to detect strong indicators from the document. The strong indicators are returned to on-prem content server 502. On-prem content server 502 performs a lookup to determine candidate records and sends the candidate records to the cloud services. Knowledge service runtime 506 processes the candidate records to perform scoring and entity linking. Knowledge service runtime 506 can return an indication of a selected entity to which the document is linked and a document type to on-prem content server 502. On-prem content server files the document in the appropriate folder for the appropriate workspace 510 based on the entity to which the document is linked and the document type.

Figure 6:
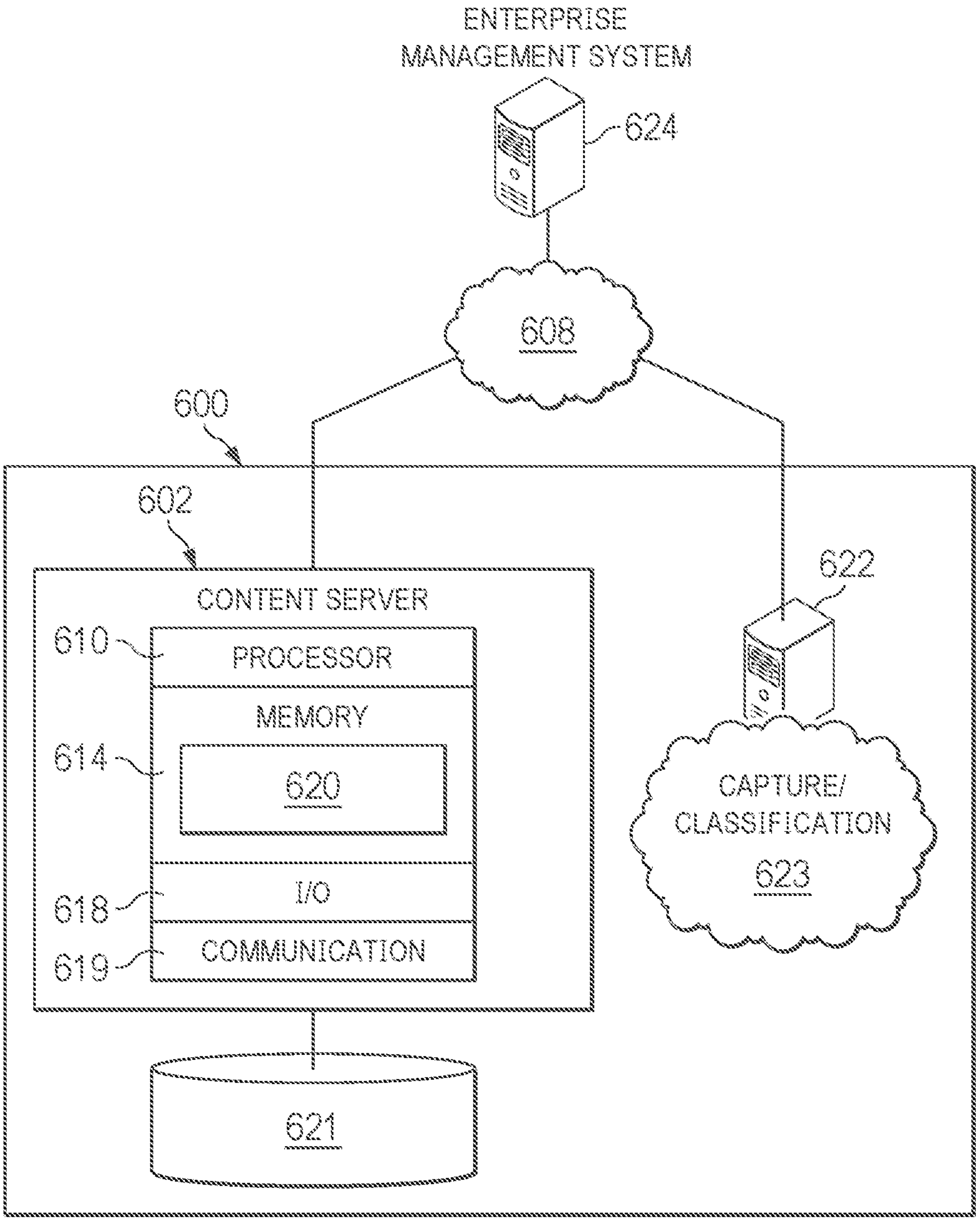
FIG. 6 illustrates one embodiment of a computing environment.

FIG. 6 is a diagrammatic representation of one embodiment of a network environment comprising an extended ECM system 600 connected to an enterprise management system 624 via a network 608. Extended ECM system 600 comprises an on-premises content server 602 to manage content and a cloud-based portion system providing capture and classifications services.

In the illustrated embodiment, for the purpose of illustration, a single system is shown for content server 602, cloud-based system 622 and enterprise management system 624. However, each of content server 602, cloud-based system 622 and enterprise management system 624 may comprise a plurality of computers (not shown) interconnected to each other over network 608.

Content server 602 comprises a computer processor 610 and associated memory 614. Computer processor 610 may be an integrated circuit for processing instructions. For example, computer processor 610 may comprise one or more cores or micro-cores of a processor. Memory 614 may include volatile memory, non-volatile memory, semi-volatile memory or a combination thereof. Memory 614, for example, may include RAM, ROM, flash memory, a hard disk drive, a solid-state drive, an optical storage medium (e.g., CD-ROM), or other computer-readable memory or combination thereof. Memory 614 may implement a storage hierarchy that includes cache memory, primary memory or secondary memory. In some embodiments, memory 614 may include storage space on a data storage array. Content server 602 may also include input/output ("I/O") devices 618, such as a keyboard, monitor, printer, electronic pointing device (e.g., mouse, trackball, stylus, etc.), or the like. Content server 602 may also include a communication interface 619, such as a network interface card, to interface with network 608, which may be a local LAN, a WAN such as the Internet, mobile network, or other type of network or combination thereof. Network 608 may represent a combination of wired and wireless networks that may be utilized for various types of network communications.

Memory 614 may store instructions executable by computer processor 610. For example, memory 614 may include code 620 executable to provide an extended ECM system or portions thereof. Data store 621, which may be part of or separate from memory 614, may comprise one or more database systems, file store systems, or other systems to store various data used by content server 602. Examples of data include, but are not limited to workspace data, such as attribute values and relationships for a plurality of workspaces that correspond to business objects at enterprise management system 624. The business objects may represent entities. The attribute values of the work paces may represent properties of the entities.

In one embodiment, the content server provides an intelligent filing folder in which documents or other content objects for filing can be placed. The content server can send metadata of the document to a cloud-based capture/classification service 623, which can return a document classification for the document. Content server 602 can perform strong indicator extraction and entity linking to file the document in the correct workspace and use the document classification to file the document in the correct folder. In other embodiments, additional or alternative steps may be performed at content server 602 or additional or alternative steps may be performed in the cloud.

Each of the computers in FIG. 6 may have more than one CPU, ROM, RAM, HD, I/O, or other hardware components. Portions of the methods described herein may be implemented in suitable software code that may reside within memory 614, on computer readable memory of cloud-based system 622 or other computer-readable memory.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer-implemented method for automatic filing of documents, the method comprising:

maintaining, by a content management system, workspace type definitions defining a plurality of workspace types, wherein each workspace type defined by the workspace type definitions includes one or more document types supported by workspaces of that workspace type;

maintaining, by the content management system, a workspace data store of workspace data that comprises attribute values describing properties of entities and relationships for a plurality of workspaces in the content management system, wherein the workspaces represent the entities;

maintaining, by the content management system, a specification of strong indicators of the entities, the strong indicators of the entities associated with the workspace types;

receiving an electronically captured document for filing by the content management system, the document comprising unstructured text;

processing the document to automatically file the document to a selected workspace from the plurality of workspaces according to an entity-linking, comprising:

extracting the unstructured text from the document to generate extracted text;

processing the document with a machine learning classifier to assign a document type to the document, wherein processing the document with the machine learning classifier comprises processing the extracted text; and based on the document type assigned to the document, selecting, by the content management system, as selected strong indicators to detect in the document, strong indicators associated with the workspace types that include the document type assigned to the document;

analyzing, by the content management system, the document using the selected strong indicators to detect a strong indicator from the extracted text, the detected strong indicator corresponding to a workspace attribute value;

querying, by the content management system, the workspace data for workspaces with the workspace attribute value and determining a result set of candidate records based on the querying, each candidate record in the result set of candidate records corresponding to a corresponding workspace that has the workspace attribute value corresponding to the detected strong indicator and including a set of attribute values from the corresponding workspace;

generating, by the content management system, scores for the result set of candidate records, wherein generating the scores for the result set of candidate records comprises, for each candidate record in the result set of candidate records:

detecting mentions in the document that match the attribute values from the set of attribute values in the candidate record; and generating a score for the candidate record based on the mentions detected in the document that match the attribute values from the set of attribute values in the candidate record;

linking the document to a selected workspace based on the scores for the result set of candidate records; and automatically storing the document to the selected workspace based on the linking.

2. The computer-implemented method of claim 1, wherein the detected strong indicator comprises a list of attribute values.

3. The computer-implemented method of claim 2, further comprising:

generating an acyclic graph representing the list of attribute values, wherein detecting the strong indicator from the document comprises evaluating the document using the acyclic graph.

4. The computer-implemented method of claim 1, wherein the detected strong indicator comprises a regular expression.

5. The computer-implemented method of claim 1, further comprising:

generating a knowledge graph from the workspace data, the knowledge graph comprising attributed nodes representing the workspaces in the plurality of workspaces and edges representing the relationships between the workspaces, wherein querying the workspace data for the workspaces with the workspace attribute value comprises querying the knowledge graph.

6. The computer-implemented method of claim 1, wherein generating the score for the candidate record based on the mentions detected in the candidate record comprises weighting mentions of attribute values detected in the extracted text based on the document type.

7. The computer-implemented method of claim 1, further comprising automatically filing the document in a folder of the selected workspace based on the document type.

8. A computer program product comprising a non-transitory, computer readable medium embodying thereon a set of computer executable instructions, the set of computer executable instructions including instructions for:

maintaining, by a content management system, workspace type definitions for a plurality of workspace types, wherein each workspace type defined by the workspace type definitions includes one or more document types supported by workspaces of that workspace type;

accessing, by the content management system, workspace data comprising attribute values describing properties of entities and relationships for a plurality of workspaces in the content management system, wherein the workspaces represent the entities;

maintaining a specification of strong indicators of the entities, the strong indicators of the entities associated with the workspace types;

receiving an electronically captured document for filing by the content management system, the document comprising unstructured text;

processing the document to automatically file the document to a selected workspace from the plurality of workspaces according to an entity-linking, comprising:

extracting the unstructured text from the document;

processing the document with a machine learning classifier to assign a document type to the document, wherein processing the document with the machine learning classifier comprises processing the extracted text; and identifying workspaces of workspace types that include the document type assigned to the document;

selecting, by the content management system, as selected strong indicators to detect in the document, strong indicators associated with the workspace types that include the document type assigned to the document;

analyzing, by the content management system, the document using the selected strong indicators to detect a strong indicator from the extracted text, the detected strong indicator corresponding to a workspace attribute value;

querying, by the content management system, the workspace data for workspaces with the workspace attribute value and determining a result set of candidate records based on the querying, each candidate record in the result set of candidate records corresponding to a corresponding workspace that has the workspace attribute value corresponding to the detected strong indicator and including a set of attribute values from the corresponding workspace;

generating, by the content management system, scores for the result set of candidate records, wherein generating the scores for the result set of candidate records comprises, for each candidate record in the result set of candidate records:

detecting mentions in the document that match the attribute values from the set of attribute values in the candidate record; and generating a score for the candidate record based on the mentions detected in the document that match the attribute values from the set of attribute values in the candidate record;

linking, by the content management system, the document to a selected workspace based on the scores for the result set of candidate records; and automatically storing, by the content management system, the document to the selected workspace based on the linking.

9. The computer program product of claim 8, wherein the detected strong indicator comprises a list of attribute values.

10. The computer program product of claim 9, wherein the set of computer executable instructions includes instructions for:

generating an acyclic graph representing the list of attribute values, wherein detecting the strong indicator from the document, comprises evaluating the text of the document using the acyclic graph.

11. The computer program product of claim 8, wherein the detected strong indicator comprises a regular expression.

12. The computer program product of claim 8, wherein the set of computer executable instructions includes instructions for:

providing a data store storing the workspace data; and generating a knowledge graph from the workspace data, the knowledge graph comprising attributed nodes representing the workspaces in the plurality of workspaces and edges representing relationships between the workspaces, wherein querying the workspace data for the workspaces with the workspace attribute value comprises querying the knowledge graph.

13. The computer program product of claim 8, wherein generating the score for the candidate record based on the mentions detected in the candidate record comprises weighting mentions of the attributed values detected in the extracted text based on the document type.

14. The computer program product of claim 8, wherein the set of computer executable instructions includes instructions for automatically filing the document in a folder of the selected workspace based on the document type.

15. A computer system comprising:

an enterprise management system comprising a set of business objects modelling entities in a business process;

a machine learning classifier trained to classify documents by document type;

a content management system comprising a plurality of workspaces, the content management system further comprising:

a memory storing:

workspace type definitions defining a plurality of workspace types, wherein each workspace type defined by the workspace type definitions includes one or more document types supported by workspaces of that workspace type; and workspace data for a plurality of workspaces, the workspace data comprising attribute values describing properties entities and relationships for the plurality of workspaces, the attribute values representing properties of the entities;

a processor;

a non-transitory, computer-readable medium embodying thereon a set of computer executable instructions executable by the processor, the set of computer executable instructions including instructions for:

specifying strong indicators of entities workspaces, the strong indicators of the entities associated with the workspace types;

receiving an electronically captured document for filing in the content management system;

processing the document to automatically file the document to a selected workspace from the plurality of workspaces according to an entity-linking, comprising:

extracting unstructured text from the document to generate extracted text;

processing the document with the machine learning classifier to assign a document type to the document, wherein processing the document with the machine learning classifier comprises processing the extracted text;

identifying workspaces of workspace types that include the document type assigned to the document;

selecting as selected strong indicators to detect in the document, strong indicators associated with the workspaces of the workspace types that include the document type assigned to the document;

analyzing the document using the selected strong indicators to detect a strong indicator from the extracted text, the detected strong indicator corresponding to a workspace attribute value;

querying the workspace data for workspaces with the workspace attribute value and determining a result set of candidate records based on the querying, each candidate record in the result set of candidate records corresponding to a corresponding workspace that has the workspace attribute value corresponding to the detected strong indicator and including a set of attribute values from the corresponding workspace;

generating scores for the result set of candidate records, wherein generating the scores for the result set of candidate records comprises, for each candidate record in the result set of candidate records:

detecting mentions in the extracted text that match the attribute values from the set of attribute values in the candidate record; and generating a score for the candidate record based on the mentions detected in the text that match the attribute values from the set of attribute values in the candidate record;

linking the document to a selected workspace based on the scores for the result set of candidate record; and automatically storing the document to the selected workspace based on the linking.

16. The computer system of claim 15, wherein the selected workspace includes a set of folders, and wherein the set of computer executable instructions includes instructions for automatically filing the document to a folder in the set of folders based on the document type.

17. The computer system of claim 15, wherein the detected strong indicator comprises a list of attribute values.

18. The computer system of claim 15, wherein the detected strong indicator comprises a regular expression.

* * * * *